United States Patent Office 2,853,536
Patented Sept. 23, 1958

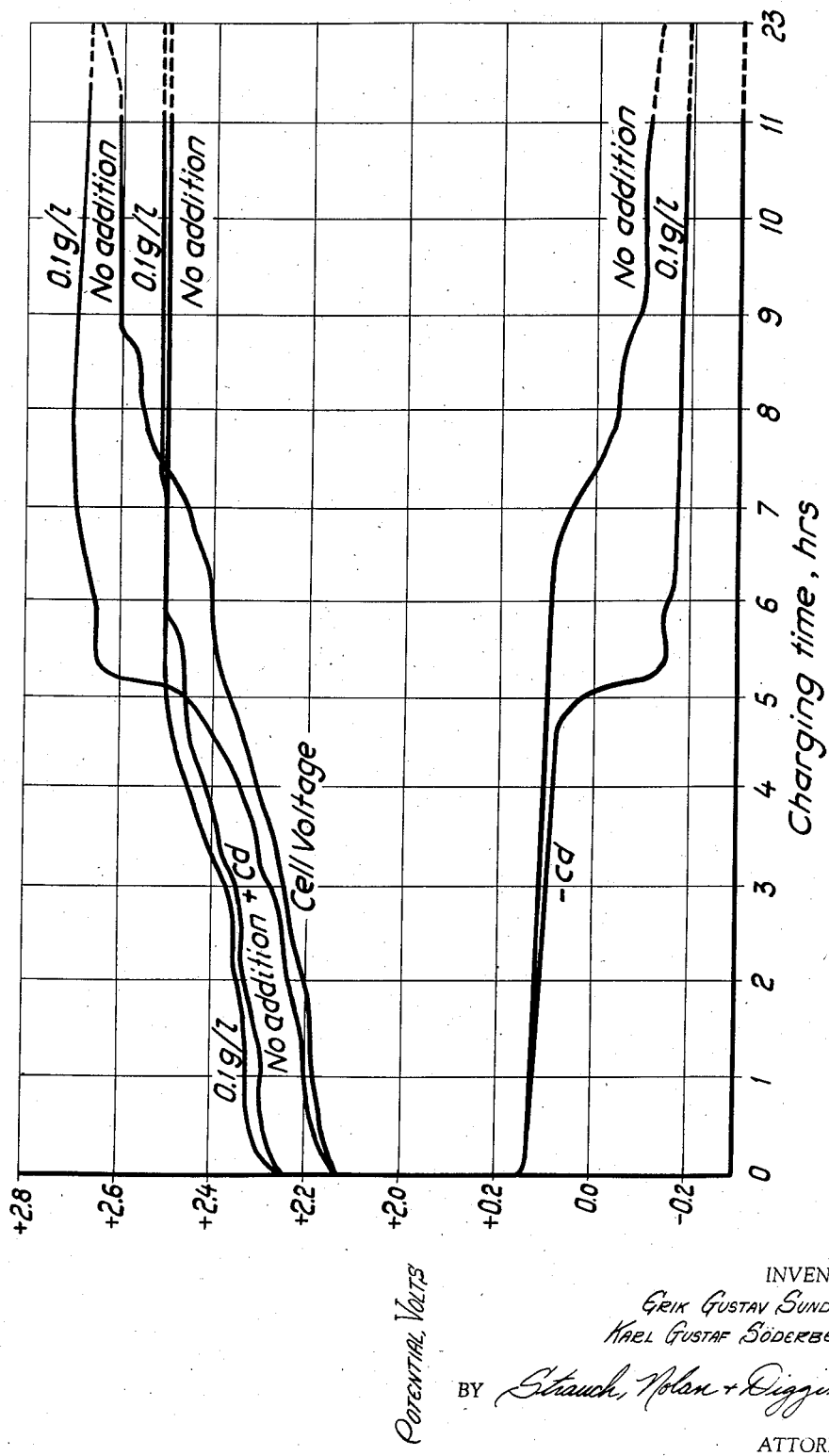

2,853,536
ACCUMULATOR CELLS

Erik Gustav Sundberg, Nol, and Karl Gustaf Söderberg, Savedalen, Sweden, assignors to Aktiebolaget Tudor, Stockholm, Sweden, a joint-stock company of Sweden Application June 9, 1955, Serial No. 514,192

Claims priority, application Sweden June 11, 1954

8 Claims. (Cl. 136—26)

One of the more serious difficulties with lead accumulators, i. e. accumulators that in the charged condition have lead negative plates and lead peroxide positive plates and use electrolytes consisting mainly of an aqueous solution of sulfuric acid, is that the plates tend to sulfate. This sulfating occurs when the accumulator is left standing or is being used for some time in a partly or fully discharged condition, i. e. when the plates contain lead sulfate and some lead sulfate crystals have an opportunity to grow at the expense of others. The crystal growth is favored by temperature variations. The large crystals are more slowly soluble during subsequent charging and as a result hydrogen evolves at the negative plate and oxygen evolves at the positive plate instead of lead being deposited at the negative plate and lead peroxide at the positive plate. Whereas a slightly sulfated battery may be restored by slow charging, a more severely sulfated battery requires slow charging in water to become at least partly restored, and a completely sulfated battery cannot be restored at all. Unfortunately most users are not in a position to charge a sulfated battery in the most appropriate way, and sulfation, once begun, continues in most cases until the battery becomes useless.

Another problem arises during the charging of a battery, especially toward the end of the charging when most of the current is used to produce hydrogen and oxygen, namely that some of the electrolyte is carried off with the gases in the form of droplets. This causes not only a gradual drop in electrolyte concentration, but also corrosion where the droplets settle. A similar difficulty arises during the formation of battery plates in the plant of the accumulator manufacturer, where the evolution of copious fumes, usually of sulfuric or perchloric acid, causes contamination of the air and corrosion of the equipment as well as electrolyte losses.

The object of this invention is to prevent sulfation of lead accumulator plates and fuming during formation and charging of such accumulators.

We are familiar with earlier attempts to solve these problems by the addition of wetting agents to the electrolyte. Thus J. L. Coustolle in French Patent No. 832,884, published Oct. 4, 1938, has added laurylalcoholsulfate to acid battery electrolytes. Others have attempted to use secondary alcohol sulfates for the same purposes. These attempts have all been dismal failures. Not only have the additives lost their effect within a time as short as a few weeks, but they have also given rise to severe corrosion of the positive plates and shortened their life very substantially.

We have found that the addition to the electrolyte of a special type of wetting agent will produce the desired effects over very long periods of time without causing any difficulties, in fact the desired effects show no tendency to diminish with time. The special type of wetting agent is characterized by containing one or more alkyl groups, cyclohexane groups or alkylcyclohexane groups in which fluorine has been substituted for the usual hydrogen.

In the preferred wetting agents of this type the aforesaid hydrophobic perfluorinated group is coupled to a hydrophilic group, containing for example a sulfate radical, a sulfonate radical, one or more hydroxyl radicals or ammonium, by means of an ester coupling, an amide coupling or a salt coupling. The general formulas of some such preferred wetting agents are

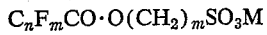

$C_nF_mSO_3M$, where $C_nF_m$ is one or more perfluoroalkyl, perfluorohexane or perfluoro(alkylhexane) groups and M is a suitable cation that does not interfere with the desired solubility of the compound or give undesirable electrical effects in the accumulator. Usable cations include hydrogen, ammonium, alkali metal and alkali earth metal ions.

The chainlengths are such that the wetting agents are soluble in the electrolytes employed in lead accumulators and in formation cells for forming the plates for such accumulators. The concentrations used are preferably such that the surface tension of the electrolyte falls above about 25 dynes/cm., higher concentrations easily giving undesirable foaming, and below about 65 dynes/cm., lower concentrations giving a very limited effect. The usefulness of this type of wetting agents is shown in the following examples.

As will be shown, the wetting agents are adsorbed in the plates to perform their function of preventing sulfation. It is inconsequential whether this adsorption takes place during the formation from a formation acid or during use from the accumulator acid. Both serve equally well to impregnate the plates with the desired material, and the amount required can be regulated by regulating the concentration of wetting agent in the formation electrolyte or in the accumulator acid. The wetting agent adsorbed in the plates is partially set free when these plates are immersed in addition-agent-free accumulator electrolyte and prevents fuming from this electrolyte. What remains in the plates is sufficient to prevent sulfation, when the concentration was high enough in the original electrolyte.

EXAMPLE 1

Four lead accumulators with glass containers, all made exactly alike and having a 10-hour capacity of 14 ampere hours, were filled with sulfuric acid of a specific gravity of 1.24. Before the acid was introduced into the accumulators there had been added, respectively 0, 0.001, 0.01 and 0.1 g./l. of a compound known in the trade as Zeromist, which on analysis proved to consist mainly of the perfluoropentanecarbonic acid esters of ethyleneglycol potassium sulfonate, $C_5F_{11}COO \cdot C_2H_4SO_3K$. Each accumulator was discharged for 1 hour at 2.8 amperes. The accumulators were then immersed in a water bath during three months time. Each weekday the water bath was warmed, so that the temperature of the electrolyte rose to 35° C., after which the temperature was allowed to drop back to 15–20° C. At the end of the period, the accumulators were recharged with 1.4 amperes. Fig. 1 shows the results with two of the accumulators, namely the one to which no addition was made and the one containing 0.1 g./l. of Zeromist. The results for the other two fall in between those shown in Fig. 1, showing that even as little as 0.001 g./l. of the compound in question had a desirable effect.

Three kinds of potential measurements were made at intervals during the charging of each cell, namely, of the total cell voltage, of the voltage between the negative plates and a cadmium probe (—Cd) and of the voltage between the positive plates and the cadmium probe (+Cd).

It will be noted that the −Cd-potential did not drop appreciably in the accumulator without the addition until 6 hours had elapsed and that about 9¼ hours were required before it dropped to the fairly steady value of −0.10 volt. After 23 hours of charging the −Cd-potential reached −0.14 volt. With 0.1 g./l. of the addition, the first drop, to −0.15 volt, appeared after about 4½ hours. A value of −0.17 volt was reached after 6¼ hours, and after 23 hours the reading was −0.19. It is evident that the accumulator without the addition was quite badly sulfated. The one with the addition evidences only a trace of sulfation by the short delay between −0.15 and −0.17 volt.

The positive plates in the cell with the addition reach the fairly constant +Cd-potential of +2.50 volt after about 5 hours and climbs another 0.01 volt after 7¼ hours. The somewhat low value of +2.51 volt points to a very slight sulfation. The positive plates in the cell without the addition were sulfated more, reaching +2.50 volt after 6 hours and not reaching any higher value after 23 hours.

The cell voltage curves show the combined effects on the negative and the positive plates.

Following discharge of both of the abovementioned accumulators at 2.44 amperes, they were charged again. This time the accumulator with 0.1 g./l. Zeromist behaved in a fully normal manner in that the small hesitation at −0.15 volt had disappeared from the −Cd-curve and −0.19 volt was reached quickly after the initial potential drop. The +Cd-potential reached a value of +2.54 volt.

The accumulator without the addition took slightly longer for the drop in −Cd-potential and reached a constant value of only −0.15 volts one hour later than the other accumulator. The +Cd-potential never rose above +2.50 volts. It is evident that the sulfation had done some permanent damage.

EXAMPLE 2

The foregoing experiment was repeated with two equal accumulators, except that one electrolyte contained 0.1 g./l. of a compound known in the trade as Proquel, said to consist of the trifluoroacetic acid salt of a soy bean amine, oxyethylated with 10 moles of ethylene oxide and containing 20 carbons in the alkyl chain, and the other no addition. The time of temperature variation was two months.

In this experiment the accumulator without the addition was again quite badly sulfated and the sulfation did not disappear after 5 charges and discharges. The one containing Proquel showed no evidence of sulfation whatsoever.

EXAMPLE 3

In this example, three equal accumulators discharged to 80% capacity were simply allowed to stand for three months in a room, where the day temperature was about 20° C. and the night temperature from about 8° C. to about 16° C. They were then tested during subsequent charging. One of the accumulators had no addition, another contained 0.05 g./l. of Zeromist and the third 0.01 g./l. of Proquel. Again the one without an addition was quite sulfated, whereas the other two showed no evidence of sulfation.

EXAMPLE 4

0, 0.001 and 0.1 g./l. Zeromist respectively were added to the sulfuric acid electrolyte in the formation tanks of an accumulator plant and the usual forming procedure was followed. On inspection with a thin light beam a thick mist was seen above the formation tank without addition. There was also much mist above the tank with 0.001 g./l. addition, but the mist did not rise as high above the top of the tank as when there was no addition. The tops of both of the foregoing tanks as well as the tops of the plates being formed were wet with electrolyte. With 0.1 g./l. addition there was no mist and the tops were entirely dry.

EXAMPLE 5

Five lead accumulators were filled with sulfuric acid of sp. gr. 1.24 and charged with the normal 2.8 amperes until the gassing became constant. The electrolytes were then exchanged for others containing 1.24 sp. gr. sulfuric acid and respectively 0, 0.001, 0.01 and 0.1 g./l. Zeromist and 0.01 g./l. Proquel and 0.1 g./l. $CF_3(CF_2)_6COONH_4$ and the charging continued. The openings at the top of the accumulators were wiped clean, and dry pieces of filter paper placed on them. After various time intervals the filter papers were removed and replaced with fresh ones. The used filter papers were put in beakers with distilled water, and the acid that had sprayed on them was titrated with 0.1-normal NaOH. The charging was continued for two days and each day the tests were repeated. The results are shown in Table I.

*Table I*

| Addition | Loss of $H_2SO_4$ in mg./h. | | |
|---|---|---|---|
| | 1st hour | 24th hour | 48th hour |
| None | 63.37 | 55.86 | 31.36 |
| 0.001 g./l. Zeromist | 2.55 | 6.21 | 4.90 |
| 0.01 g./l. Zeromist | 0.91 | 0.00 | 0.00 |
| 0.1 g./l. Zeromist | 0.00 | 0.00 | 0.00 |
| 0.01 g./l. Proquel | 0.00 | 0.00 | 0.00 |
| 0.1 g./l. $C_7F_{15}COONH_4$ | 0.00 | 0.00 | 0.00 |

The beneficial effect of even very low concentrations of the perfluoralkyl-type of wetting agent is clearly demonstrated.

EXAMPLE 6

Amounts of 0, .001, 0.01, 0.1 g./l. Zeromist were added to 1.24 sp. gr. sulfuric acid, that was used as the electrolyte in three equal accumulators. These accumulators were then cycled continuously for about 3 months. The discharge current was 2 amperes for 20 minutes, the charging current 1.3 amperes for 40 minutes, so that 24 complete cycles were run each day. During the first few cycles the concentrations of the addition agent in the electrolyte dropped to about one-quarter of the original concentration by adsorption in the battery plates and then remained constant during the next 1608 cycles. This constancy bespeaks a high stability of the addition.

These tests were followed by (1) controlled charging, first at 2.8 amperes until gasevolution began and then at 1.4 amperes, of the two accumulators containing 0 and 0.1 g./l. of addition, (2) controlled discharging at 2.44 amperes and (3) controlled charging as under (1). The charge and discharge curves respectively for the three accumulators were almost alike, indicating that there is no detrimental effect of the additions on the capacity of an accumulator.

The accumulators were then disassembled and the positive plates inspected. No damage was observed on the positive plates.

EXAMPLE 7

Four accumulators with 1.25 sp. gr. sulfuric acid containing respectively 0.1 g./l. sodium laurylalcohol sulfate $C_{12}H_{25}OSO_3Na$, 0.1 g./l. Teepol (the sodium salt of a secondary aliphatic alcohol sulfate

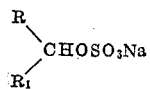

where R and $R_1$ are long alkyl groups), 0.1 g./l. $C_7F_{15}COONH_4$ and 0.02 g./l. Proquel were subjected to charge and discharge tests as in Example 7 for two months. Within 2 weeks one could see a light yellow oil on top of the accumulator electrolytes with Na-laurylalcohol sulfate and Teepol, and the amount increased with time. No oil could be found on top of the electrolyte with the fluorinated compounds. On disassembly of the charged accumulators, the ones containing the fluorinated wetting agents had fully normal position plates, but in those containing Na-laurylalcohol sulfate or Teepol the positive plate grids showed some corroded areas. In addition, the lead peroxide positive active material in the accumulator containing Na-laurylalcohol sulfate showed white sulfated spots near the grids.

We claim:

1. A lead accumulator cell having a fluorinated wetting agent in its active material, said wetting agent being soluble in the accumulator acid and selected from the group consisting of a perfluoralkyl, perfluorcyclohexane and perfluoralkylcyclohexane group which is coupled to a solubilizing group.

2. A lead accumulator cell as claimed in claim 1 in which said fluorinated wetting agent is selected from at least one group of compounds consisting of $$C_5F_{11}COO \cdot C_2H_4SO_3M$$

$C_8F_{17}SO_3M$ and $C_8F_{15}SO_3M$, where M is a cation.

3. A lead accumulator cell having an electrolyte containing a substantial amount of sulfuric acid and a fluorinated wetting agent in an amount that on addition to the sulfuric acid reduces its surface tension to at most 65 dynes per centimeter.

4. A lead accumulator cell as claimed in claim 3 in which the said fluorinated wetting agent is selected from the group consisting of perfluoroalkyl, perfluorocyclohexane and perfluoroalkylcyclohexane groups coupled to a solubilizing group.

5. A lead accumulator cell as claimed in claim 4 in which said fluorinated wetting agent is selected from the group of compounds consisting of $C_5F_{11}COO \cdot C_2H_4SO_3M$, $C_8F_{17}SO_3M$ and $C_8F_{15}SO_3M$, where M is a cation.

6. A lead accumulator cell having a fluorinated wetting agent in its active material and also dissolved in its electrolyte in which the said fluorinated wetting agent is selected from the group consisting of perfluoraklyl, perfluorcyclohexane and perfluoralkylcyclohexane groups coupled to a solubilizing group.

7. A lead accumulator cell as claimed in claim 6, in which said fluorinated wetting agent is selected from the group of compounds consisting of $C_5F_{11}COO \cdot C_2H_4SO_3M$, $C_8F_{17}SO_3M$ and $C_8F_{15}SO_3M$, where M is a cation.

8. In a lead accumulator cell having lead negative plates and lead peroxide positive plates, an electrolyte comprising an aqueous solution of sulfuric acid and a wetting agent dissolved therein in an amount sufficient to prevent sulfation of the plates, the wetting agent being at least one selected from the group consisting of $$C_nF_mCO-O(CH_2)_mSO_3M$$

$$C_nF_mCO-NH-(CHOH-CH_2-CH_2)_mCH_3$$

$$C_nF_mCO-ONH_4$$

$$C_nF_mCO-O(CH_2)_mOSO_3M$$

and $C_nF_mSO_3M$ where $C_nF_m$ is at least one of the groups selected from the perfluoroalkyl, perfluorohexane, perfluoroalkylhexane, perfluorocyclohexane and perfluoroalkylcyclohexane groups and M is a cation selected from the group consisting of the hydrogen, ammonium, alkali metal and alkali earth metal ions.

References Cited in the file of this patent

UNITED STATES PATENTS

| | | |
|---|---|---|
| 1,435,541 | Mabrey | Nov. 14, 1922 |
| 1,989,312 | Gerber | Jan. 29, 1935 |
| 2,331,396 | Humbaugh | Oct. 12, 1943 |
| 2,655,471 | Chester | Oct. 13, 1953 |
| 2,750,334 | Brown | June 12, 1956 |

FOREIGN PATENTS

| | | |
|---|---|---|
| 534,618 | Great Britain | Mar. 12, 1941 |

OTHER REFERENCES

Addition Agents for Negative Plates of Lead-Acid Storage Batteries, Ritchie, reprint 92–34, 1947.